Patented Sept. 16, 1941

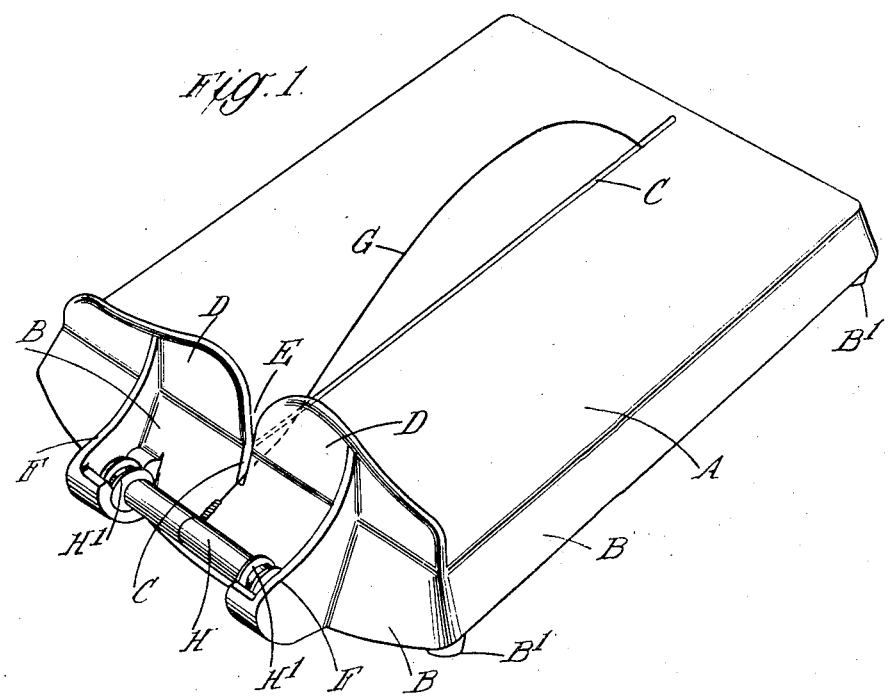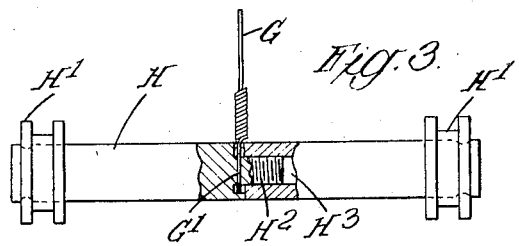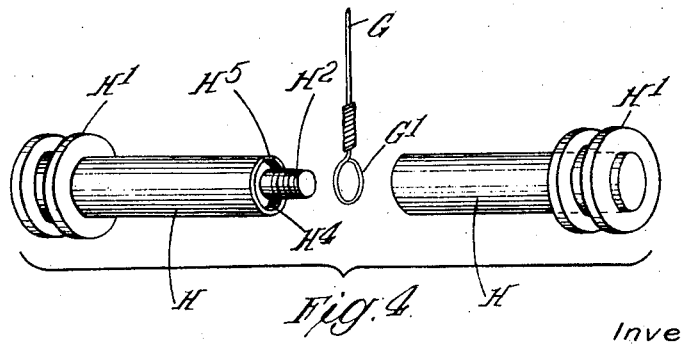

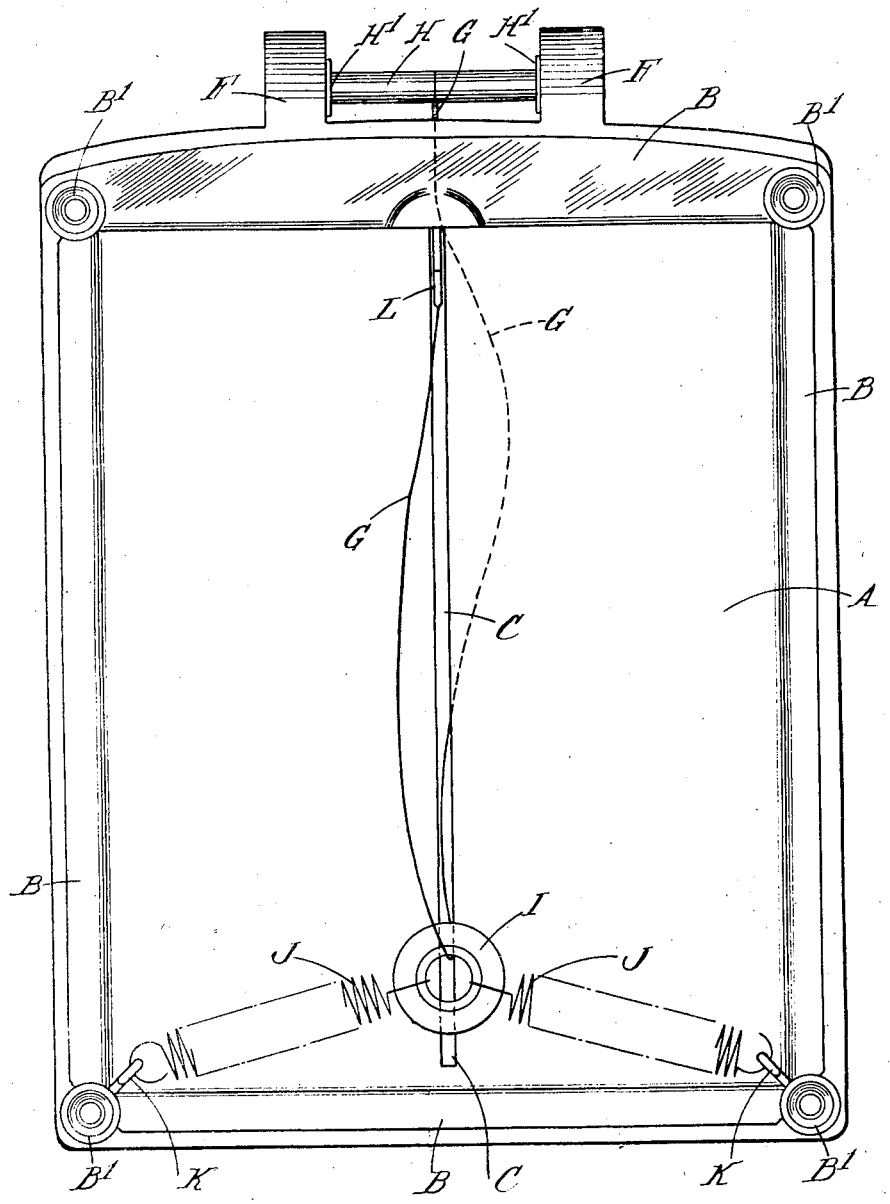

2,255,942

UNITED STATES PATENT OFFICE 2,255,942

DEVICE FOR CUTTING CHEESE OR SIMILAR SUBSTANCES

Lionel Mark Salmon, Brentford, England

Application December 27, 1938, Serial No. 248,000
In Great Britain January 11, 1938

6 Claims. (Cl. 31—25)

This invention relates to devices for cutting cheese or other substances of a similar nature, wherein the cutter is in the form of a thin wire which is adapted to be pulled or drawn through the cheese or the like so as to divide it.

The chief object of the present invention is to provide a cheese cutting device which enables the cheese to be conveniently held or placed in position for the cutting operation and to facilitate the passage of the cutting wire through the cheese. A further object of the invention is to provide an improved form of handle for attachment to a cheese cutting wire, which handle can be readily affixed to or removed from the wire and is not likely to be displaced when in use.

According to one feature of the invention, the device comprises a stand or plate upon which the cheese is placed and supported for the cutting operation, and which has a slot wherein the cutting wire is located, the said wire being retained at one end under the said stand or plate and having at the other end above the stand or plate a gripping handle by means of which the wire can be pulled or drawn through the cheese positioned on the stand, the construction and arrangement being such that the wire is actually pulled or drawn along the slot during the cutting operation. The movement of the cutting wire along the slot greatly facilitates the cutting operation, as the wire is not only pulled downwardly through the cheese, but is at the same time caused to move forwardly, with the result that the passage of the wire through the cheese is much more easily effected than is the case with wire cutters which are positively held at one end and are merely pulled downwardly through the cheese. The stand or plate on which the cheese can be supported, has at its front part an upstanding stop or wall against which the cheese can be held during the cutting operation. The front of the device may also be formed with suitable supports to receive and retain the cutter-wire handle in position when it is not in use. The end of the wire below the stand or plate is attached to a spring arrangement which, when the wire has been released after having been drawn forwardly to effect the cutting operation, serves to return the wire towards the rear end of the stand or slot, leaving sufficient length of the wire above the plate or stand to permit of the handle being conveniently placed in its support or rest at the front of the stand. Preferably, the wire below the stand passes through a ring connected with the springs, and normally located near the rear part of the stand, the wire extending to and being connected to a fixed part at the front of the device.

According to a further feature of the invention, the handle is formed so that it can be readily fitted or attached to the wire, and for this purpose it is made in the form of a rod consisting of two parts, one having a threaded projection for screwing into a correspondingly formed end in the other part, and around the said threaded projection there is a recess to receive a loop on the wire when placed around the threaded projection, the recess being surrounded by a peripheral part having a slot through which the wire projects when the loop is held in position by the two parts of the rod being screwed tightly together. The ends of the handle may have rubber flanges which serve to grip the support or rest in which the handle is placed when not in use.

In order that the invention may be clearly understood and readily carried into effect, the same will now be more fully described with reference to the accompanying drawings, in which:

Figures 1 and 2 are respectively a perspective view and an underside plan view of one construction of the improved cheese cutting stand or the like.

Figure 3 is a view of the handle partly in section showing the cutter wire attached.

Figure 4 is a perspective view showing the handle parts and the wire separated.

The device shown in Figure 1 comprises a stand which is preferably in the form of an enamelled casting having a flat upper part A and a skirt or flange B, providing front, rear and side walls which are slightly splayed or inclined outwardly as indicated in Figure 1, supporting feet or pads $B^1$ which may be made of rubber or any other suitable material being provided at the corners of the walls B. In the said stand or plate A is a slot C extending from near the rear wall to the front wall, into which latter the slot actually extends for a short distance. At the front edge of the stand A is an upstanding wall D which is divided at the middle to provide an opening E which forms a guide leading to the forward part of the slot where it terminates in the aforesaid front wall. The front wall has on its exterior, lugs F projecting outwardly and shaped at their lower parts with seatings to receive the ends of the handle of the cutter wire as hereinafter described.

The cutter wire is indicated by the reference letter G and the handle attached to one end thereof is designated by the letter H. As shown more particularly in Figure 1, the wire G extends through the slot C to the underside of the plate or stand A (see Figure 2) where within the walls B it is passed through a ring I which is connected to the inner ends of two coil springs J, whose other ends are connected to eyelets K fixed in the corners of the side and rear walls as shown in Figure 2. The wire passes through the said ring and is connected to a lug or eyelet L at the rear side of the front wall B. The other end of the wire as aforesaid is connected to the handle or gripping piece H, which latter is in the form of a metal rod having rubber flanges $H^1$ at its ends, which flanges are adapted to fit into the rests or supports F wherein they grip sufficiently to retain the handle in position and against accidental movement or displacement.

The handle as shown in Figures 3 and 4 is made in two parts, one having a screw threaded projection or end $H^2$ to screw into a threaded hole $H^3$ in the adjoining end of the other handle part and around the said projection $H^2$ is a recess $H^4$ within the peripheral edge which has a slot or opening $H^5$. The end of the wire G has a loop $G^1$ which is passed over the projection $H^2$ so as to fit in the recess $H^4$ with the wire projecting through the slot $H^5$, so that when the two parts of the handle are screwed tightly together, the loop is held or clamped between the two parts and it is housed within the said recess $H^4$ so that no part of the loop is visible.

In using the device as shown in Figure 1, the handle and wire are lifted and the cheese to be cut is placed on the stand and is located in the required position against the stop or upstanding wall D. The handle is then pulled forwardly and at the same time downwardly, so that the wire is drawn through the cheese as it is pulled along the slot. This forward movement of the wire along the slot considerably facilitates the actual passage of the wire through the cheese. When the wire has been drawn completely through the cheese and divided it into two parts, the latter are removed from the stand. The wire in being moved forwardly in the manner above described is pulled against the action of the aforesaid springs J so that as soon as the pull on the wire is relieved, the springs return the ring I and the wire to the normal position at or near the rear of the device, leaving only sufficient wire at the upper part to enable the handle H to be placed in its supports wherein it is retained against accidental displacement by the rubber flanges gripping the seatings or supports in which they are located. The aforesaid ring I comprises a curved or rounded metal portion lying within the inner periphery of a rubber ring, the curved or rounded metal contacting with the wire and avoiding kinking of the wire as the curved or rounded metal surface affords a smooth, easy action. The rubber portion serves as a buffer when the ring is drawn against the rear side of the front of the stand at the end of the forward movement of the ring. It will be appreciated that the handle construction and its method of attachment to a cutting wire are important features of the invention.

What I claim and desire to secure by Letters Patent of the United States is:

1. A device for cutting cheese or the like, comprising a stand or plate on which the cheese to be cut is placed or supported and which has a slot located therein through which passes the cutting wire which is retained at one end and has a handle or gripping portion by means of which the wire can be pulled so as to be drawn along the slot and through the cheese when the latter is supported on the stand or plate, a controlling ring at the under side of the device, and spring means connected to fixed parts of the device, said spring means being connected to and supporting said controlling ring, the said cutting wire passing through the said controlling ring.

2. A device as in claim 1, in which the said ring has a rounded or curved metal or similar inner surface.

3. A device as in claim 1, in which the said ring has a rounded or curved inner surface and is surrounded by a rubber ring or similar cushion or buffer.

4. A device as in claim 1, in which the handle for the cutting wire is in the form of a rod constituted by two parts, one of which has a projection extending from a recessed end and adapted to screw into the other part, the said recess being adapted to receive within it a loop on the wire, the peripheral part around the recess having a slot through which the wire extends from the loop when arranged within the recess.

5. A device as in claim 1, in which the handle is provided with rubber flanges or ends, the front part of the stand being provided with forwardly extending lugs which are shaped to receive and support the handle, said rubber flanges or ends on the handle being adapted to fit tightly in and grip the said supporting lugs.

6. A device as in claim 1, in which the stand comprises a flat top having depending integral front, rear and side walls, with an open bottom, said walls supporting the stand and housing the spring means and controlling ring, the device having a slot through which the wire from the controlling ring passes, extending from near the rear wall along the flat top into the integral front wall and an integral upstanding wall at the forward edge of the stand to form a stop for the cheese being cut, and being provided with an opening to receive the cutting wire and to guide it into the aforesaid slot in the integral front wall to a position below the said forward edge and below the flat top to ensure passage of the cutting wire completely through the cheese supported on the flat top against the upstanding wall.

LIONEL MARK SALMON.